United States Patent
Vijayan et al.

(10) Patent No.: US 8,935,294 B2
(45) Date of Patent: Jan. 13, 2015

(54) MINIMIZING COMPUTER RESOURCE USAGE WHEN CONVERTING DATA TYPES OF A TABLE COLUMN

(75) Inventors: Jayaprakash Vijayan, Foster City, CA (US); Kenton Noble, Bainbridge Island, WA (US); Subash Chadalavada, Fremont, CA (US); Sujith Sreedharan, Hyderabad (IN); Suvasish Sharma, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 886 days.

(21) Appl. No.: 11/201,797

(22) Filed: Aug. 10, 2005

(65) Prior Publication Data

US 2007/0038590 A1    Feb. 15, 2007

(51) Int. Cl.
*G06F 17/00* (2006.01)
*G06F 17/30* (2006.01)

(52) U.S. Cl.
CPC .............. *G06F 17/30569* (2013.01)
USPC .......... 707/802; 707/790; 358/3.23

(58) Field of Classification Search
USPC ........ 358/518, 3.23, 530, 523–525, 1.13, 1.1, 358/1.14, 1.15, 1.9; 709/217, 224, 223, 709/249, 238; 714/47, 39
See application file for complete search history.

(56) References Cited

U.S. PATENT DOCUMENTS

| | | | |
|---|---|---|---|
| 5,227,967 A | 7/1993 | Bailey | |
| 5,315,709 A | 5/1994 | Alston et al. | |
| 5,440,743 A | 8/1995 | Yokota et al. | |
| 5,448,727 A | 9/1995 | Annevelink | |
| 5,555,388 A | 9/1996 | Shaughnessy | |
| 5,608,903 A | 3/1997 | Prasad et al. | |
| 5,640,550 A | 6/1997 | Coker | |
| 5,717,924 A * | 2/1998 | Kawai .................................. | 1/1 |
| 5,978,426 A | 11/1999 | Glover et al. | |
| 6,016,497 A | 1/2000 | Suver | |
| 6,122,630 A | 9/2000 | Strickler et al. | |
| 6,122,640 A | 9/2000 | Pereira | |
| 6,173,313 B1 | 1/2001 | Klots et al. | |
| 6,268,850 B1 | 7/2001 | Ng | |
| 6,304,867 B1 | 10/2001 | Schmidt | |
| 6,324,535 B1 * | 11/2001 | Bair et al. ..................... | 345/419 |
| 6,363,387 B1 | 3/2002 | Ponnekanti et al. | |
| 6,460,055 B1 | 10/2002 | Midgley et al. | |

(Continued)

OTHER PUBLICATIONS

Lassen et al. Experiences with object oriented development in PL/SQL, Center for Object Technology COT/4-18-V1.4, 2000.

(Continued)

*Primary Examiner* — Steven Kau
(74) *Attorney, Agent, or Firm* — Hickman Palermo Truong Becker Bingham Wong LLP (57) ABSTRACT

Online conversion procedures avoid the need to generate a copy of an entire table in order to convert the data type of a column in the table. To convert a table's column to a new data type, a replacement column is created in the table, the replacement column having the new data type. A background process dedicated to converting the column translates values in the column of the old data type to the new data type and stores the converted values in the replacement column. In addition, as transactions of users are applied to rows in the table, the value in the column of the old data type in the rows is converted and stored in the replacement column. Once the background process completes, the replacement column is used in lieu of the converted column.

20 Claims, 3 Drawing Sheets

(56) References Cited

U.S. PATENT DOCUMENTS

| | | | |
|---|---|---|---|
| 6,480,848 B1 | 11/2002 | DeKimpe et al. | |
| 6,519,613 B1 | 2/2003 | Friske et al. | |
| 6,542,895 B1 | 4/2003 | DeKimpe et al. | |
| 6,598,059 B1 | 7/2003 | Vasudevan et al. | |
| 6,611,848 B1 | 8/2003 | Bradley | |
| 6,633,870 B1 | 10/2003 | Bradley | |
| 6,633,883 B2 | 10/2003 | Koskas | |
| 6,681,225 B1 | 1/2004 | Uceda-Sosa et al. | |
| 6,745,209 B2 | 6/2004 | Holenstein et al. | |
| 6,769,124 B1* | 7/2004 | Schoening et al. | 719/316 |
| 6,801,983 B2 | 10/2004 | Abe et al. | |
| 6,834,290 B1 | 12/2004 | Pugh et al. | |
| 7,574,461 B1 | 8/2009 | Armorer et al. | |
| 7,693,889 B1 | 4/2010 | Armorer et al. | |
| 2002/0019972 A1 | 2/2002 | Grier et al. | |
| 2002/0087271 A1 | 7/2002 | Rozenshtein et al. | |
| 2002/0133510 A1* | 9/2002 | Lau | 707/203 |
| 2002/0188600 A1 | 12/2002 | Lindsay et al. | |
| 2003/0154216 A1* | 8/2003 | Arnold et al. | 707/104.1 |
| 2003/0217069 A1 | 11/2003 | Fagin et al. | |
| 2003/0229610 A1 | 12/2003 | Van Treeck | |
| 2004/0064487 A1 | 4/2004 | Nguyen et al. | |
| 2005/0102303 A1* | 5/2005 | Russell et al. | 707/101 |
| 2005/0149475 A1* | 7/2005 | Chkodrov et al. | 707/1 |
| 2005/0154695 A1 | 7/2005 | Gonzalez et al. | |
| 2006/0015528 A1 | 1/2006 | Hejlsberg et al. | |
| 2006/0085457 A1 | 4/2006 | Gelfand | |
| 2007/0038590 A1 | 2/2007 | Vijayan et al. | |
| 2007/0038651 A1 | 2/2007 | Bernstein et al. | |
| 2007/0079140 A1 | 4/2007 | Metzger et al. | |
| 2007/0219951 A1 | 9/2007 | Ahmed et al. | |
| 2007/0282515 A1 | 12/2007 | Arora | |

OTHER PUBLICATIONS

Object Cache Navigation, Oracle Call Interface PRogrammer's Guide, Release 2 (9.2), Part No. A96584-10, 1996, 2002.

Date et al, A Guide to SQL/DS, 1989, Addison-Wesley, Chapter 10.

Quest Software, Inc., LiveReorg®, "*Reorganization for the 24×7 Database,*" 2001.

Paapanen, Eric, et al., "Oracle Database Application Developer's Guide—Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeff's SQL Server Blog 10, Apr. 22, 2008, 45 pages.

T-SQL, "sp_rename (T-SQL)", printed Apr. 22, 2008, 3 pages.

Davidson, Tom. "Managing Schema Changes (Part 2)." MSSQL Server Development Customer Advisory Team. Mar. 31, 2006. Microsoft Corporation. Nov. 19, 2000 http://blogs.msdn.com/sqlcat/archive/2006/03/31/566046.aspx, 11 pages.

Ambler, Scott, and Pramod Sadalage. Refactoring Databases: Evolutionary Database Design. Mar. 3, 2006, 7 pages.

\* cited by examiner

MINIMIZING COMPUTER RESOURCE USAGE WHEN CONVERTING DATA TYPES OF A TABLE COLUMN

RELATED APPLICATION

This application is related to U.S. patent Ser. No. 09/968,703, entitled Online Reorganization and Redefinition of Relational Database Tables, filed by Mahesh Subramaniam, et al. on Sep. 28, 2001, the contents of which are herein incorporated by reference as if originally set forth herein.

This application is related to U.S. patent Ser. No. 08/705,739, entitled Universal Schema System, filed by Kenton E. Noble, et al. on Aug. 30, 1996, now U.S. Pat. No. 5,926,810, the contents of which are herein incorporated by reference as if originally set forth herein.

FIELD OF THE INVENTION

The present invention relates to online conversion of data within a database system.

BACKGROUND OF THE INVENTION

Database management systems (DBMS), and the applications that use them ("database applications"), are constantly evolving. An example of a DBMS is the Oracle™ database server, produced by Oracle Corporation. In the evolution of DBMSs and database applications, there are many scenarios that require converting the data type of a column in a database table, to support new features and enhancements to the database application or the DBMS. One such scenario involves LONG columns, which store large amounts of data in a table column. Some features of a DBMS that have evolved cannot be used for a table that contains LONG columns. To overcome this limitation, columns with LONG data type must be converted to a LOB ("Large Objects") data type.

A type of approach for converting the data type of a table column is referred to as offline conversion. In offline conversion, a process dedicated to converting a column and its values is given exclusive access to the table. No transactions for other processes are allowed against the table. General access to the table is revoked. One approach to offline conversion is offline "in-situ" conversion, which involves adding a new column ("in situ") for a new data type, converting values from rows in the original column to the new data type, updating the new column of the rows with these values, and then publishing the new column as the original column.

Processes involved in converting a data type of a column are referred to herein as conversion processes. The period of time during a conversion when access to a table is limited to conversion processes is referred to herein as downtime. The conversion time is approximately proportional to data change size, therefore offline conversion demands significant downtime if the table contains large amounts of data.

Processes running on a DBMS that are not dedicated to converting a data type are referred to herein as non-conversion processes. Non-conversion processes include, for example, processes associated with a user session, which are typically established in response to a database connection issued by an entity (e.g. application, client) identifying and authenticating itself as a particular user. A DBMS associates a name, authenticating information (e.g. password), access privileges (e.g. access to a particular schema or database objects, security level) with a user.

For convenience of expression, a table that contains a column whose data type is being converted and whose column values are being converted to the new data type is referred to herein as a table undergoing conversion. Thus, the phrase "a table under going conversion" is just a convenient way of expressing that a data type of a column in the table is being converted and the values in the column are being converted to the new data type.

Another variation of offline conversion is offline replacement-table conversion. Under this variation of the offline conversion, a "replacement table" is created with columns that are identical to the table undergoing conversion, except that the replacement table has a new column with the new data type. The new column will become in effect the original column with the new data type. The entire data from the original table is copied to the replacement table, and values from the original column are converted to the new data type and inserted into the new column. In addition, indexes and other database objects dependent on the original table are built on the replacement table. The replacement table is then published as the original table. During the period of conversion, access to the tables is limited only to the conversion process.

Another type of approach for converting the data type of a column is online conversion. The online conversion removes most access restrictions on the table undergoing conversion, allowing non-convert processes to access the table while the table is undergoing conversion. Online conversion, however, does involve some downtime.

A form of online conversion is online replacement-table conversion. Similar to offline replacement-table conversion, this form of online conversion uses a replacement table. The replacement table is created with columns that are identical to the "original table" and a new column of the new data type. Indexes and other database objects dependent on the original table are built on the replacement table. The entire data from the original table is copied to the replacement table and values of the old data type from the original column are converted to the new data type and inserted into the new column.

Unlike offline conversion, however, during online replacement-table conversion, non-conversion processes are allowed access to the original table. Changes made by transactions of non-conversion processes are tracked in a log. After all the data from the table have been copied and converted to the new table, the replacement table is synchronized, that is, the transactions recorded in the log are applied to the replacement table, a process that may also involve conversion of original column values. The synchronization process may occur one or more times depending on the frequency of changes made by non-conversion processes.

Under online replacement-table conversion, there are two periods of downtime. During the first downtime, the infrastructure needed to support the conversion is created. This operation includes creation of the log for the original table and a replacement table with a new column for the new data type. The creation of the replacement table does not, in itself, require downtime. If the DBMS allows creation of a log during uptime, then a period of downtime would not be required for creating the log.

The second downtime occurs at the end of the conversion. A purpose of this downtime is to prevent transactions from changing the original table. A final synchronization is performed during this downtime to apply any transactions from the log not yet applied.

Another important purpose of the second downtime is to coordinate publication of the replacement table with the installation of the new version of database applications that have been adapted to use the new data type for the converted column. Publication refers to making changes to a DBMS that are needed to cause the replacement table to be recognized and treated as the original table by the DBMS. Such changes include changing a DBMS's metadata. It is important that the beginning and end of the downtime be synchronized with the installation of the new version of database applications. The old version of the database application expects the converted column to have the old data type while the new version expects the converted column to have the new data type. The downtime provides a period of time in which to install the new version of the database application so that the new version is running when the replacement table is published but not before.

An advantage of online replacement-table conversion is that it requires potentially less down time. Conversion processes do not require exclusive access during conversion. Database applications may modify a table during conversion. Nevertheless, the downtime can be significant if a large amount of data changes from the log needs to be processed during the final synchronization.

A disadvantage of online replacement-table conversion is that it requires more computer resources than offline conversion, particularly offline in-situ conversion, which does not use a replacement table. Storage space is not only needed for the replacement table and associated database objects, but also the log. Furthermore, CPU resources are needed to copy the entire data from the original table to the replacement table, to recreate the associated database objects, and to record transactions to the log and apply them to the replacement table. If the original table is very large, the amount of resources consumed to convert the data type of a column can be very significant.

The burden placed on resource usage is further aggravated by the fact that column data types often must be converted for batches of tables at a time. Often, database systems and base applications evolve in cycles that involve column data type conversion for multiple tables. A new version of an application may contain changes needed for all the column data type changes in a cycle. As a result, all the tables must undergo conversion simultaneously. For the forms of conversion that use a replacement table, converting many tables simultaneously requires storing a copy of many tables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for performing online conversion procedures is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Online conversion procedures described herein avoid the need to generate a copy of an entire table (i.e. a replacement table) in order to convert the data type of a column in the table and avoid the need to synchronize the copy with user changes to the table that occur during conversion. To convert a table's column to a new data type, a replacement column in the table is created, the replacement column having the new data type. A background process dedicated to converting the column translates values in the column of the old data type to the new data type and stores the converted values in the replacement column. In addition, as user transactions update values in the column of the old data type, the values are converted and stored immediately in the replacement column. Once the background process completes, the replacement column is published in place of the converted column.

When the background process completes, the column of the rows affected by user transactions has already been converted. The need to track and synchronize the changes and spend downtime doing so is thereby eliminated. Finally, the need to expend CPU resources to process and store copies of the entire table and associated database objects is avoided—substantial savings in CPU resources is thereby realized.

Illustrative Table

Figure 1:
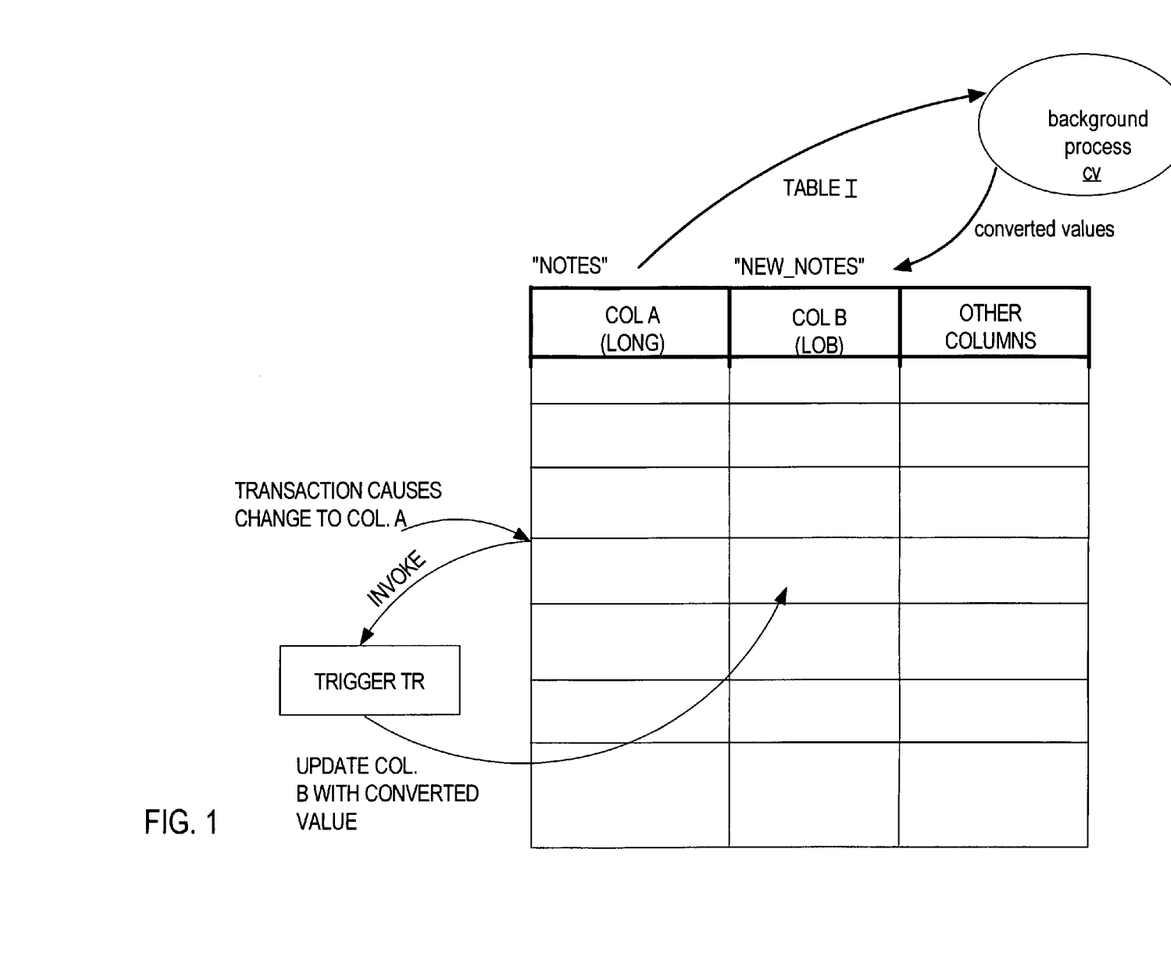
FIG. 1 is a diagram of a table with a column undergoing data type conversion according to an embodiment of the present invention.

FIG. 1 is a block diagram that depicts a table in a DBMS and a column undergoing data type conversion, which are used to illustrate an embodiment of the present invention. Referring FIG. 1, it shows table T with column A and column B. The data type of column A is being converted from LONG to LOB. Column B is the replacement column for column A and has a data type of LOB. Column B was created during an initial stage of conversion, as shall be described in greater detail later. Until publication occurs at the end of the conversion, column B is hidden from users, that is, users cannot access or see the column—the application will not even acknowledge, report, or otherwise indicate its existence to a user.

Trigger TR is a trigger created for column A at the beginning of conversion. A trigger is a procedure that a DBMS invokes when it detects the occurrence of an event associated with the trigger. Trigger events are events related to database objects, objects such as a table, column, or view, that are defined to cause invocation of the trigger. For example, a trigger event could be the insertion of a row of a table or the commencement or completion of an update of a column in a row.

Trigger TR in particular is invoked by a change made to column A of a row of table T. Trigger TR converts a value in column A from LONG to LOB and inserts the converted value in column B of the row. Such a conversion may include converting a value from column A to a large binary object, storing the object inline in column B or storing the object in a LOB repository (i.e. a file) and updating column B with a LOB locator for the large binary object.

Database metadata defines trigger TR, and in particular, its association with column A and the trigger events that invoke trigger TR. Database metadata is data that defines data structures or data types used by a DBMS, including tables, like table T, or columns, like columns A and B, and triggers, like trigger TR. The particular part of database metadata that defines a database object is referred to as that database object's metadata definition. The database metadata includes, for example, a metadata definition of table T, of column A, of column B, and of trigger TR.

The metadata definition of a database object defines structure and characteristics of a database object. For example, a table's metadata definition defines the table's name, what columns the table contains, and in what files the table's data is stored. A column's metadata definition specifies the column's data type and name of the column. The name of a table or the column, when included in database commands (e.g. queries) issued to a DBMS, is recognized by the DBMS as referring to the table and the column. The name of column A is "NOTES" while the name of column B is "NEW_NOTES".

A database language defines commands for query processing, data definition, and data manipulation that are recognized by a DBMS. An example of a database language is Structured Query Language (SQL). Metadata definitions are created and updated in response to data definition language ("DDL") commands issued to a DBMS. DDL commands include commands to define tables, columns, and triggers.

Background conversion process CV is a process that runs in the background and dedicated to converting values from column A. Background process CV runs during conversion.

Illustrative Online Conversion Procedure

Figure 2:
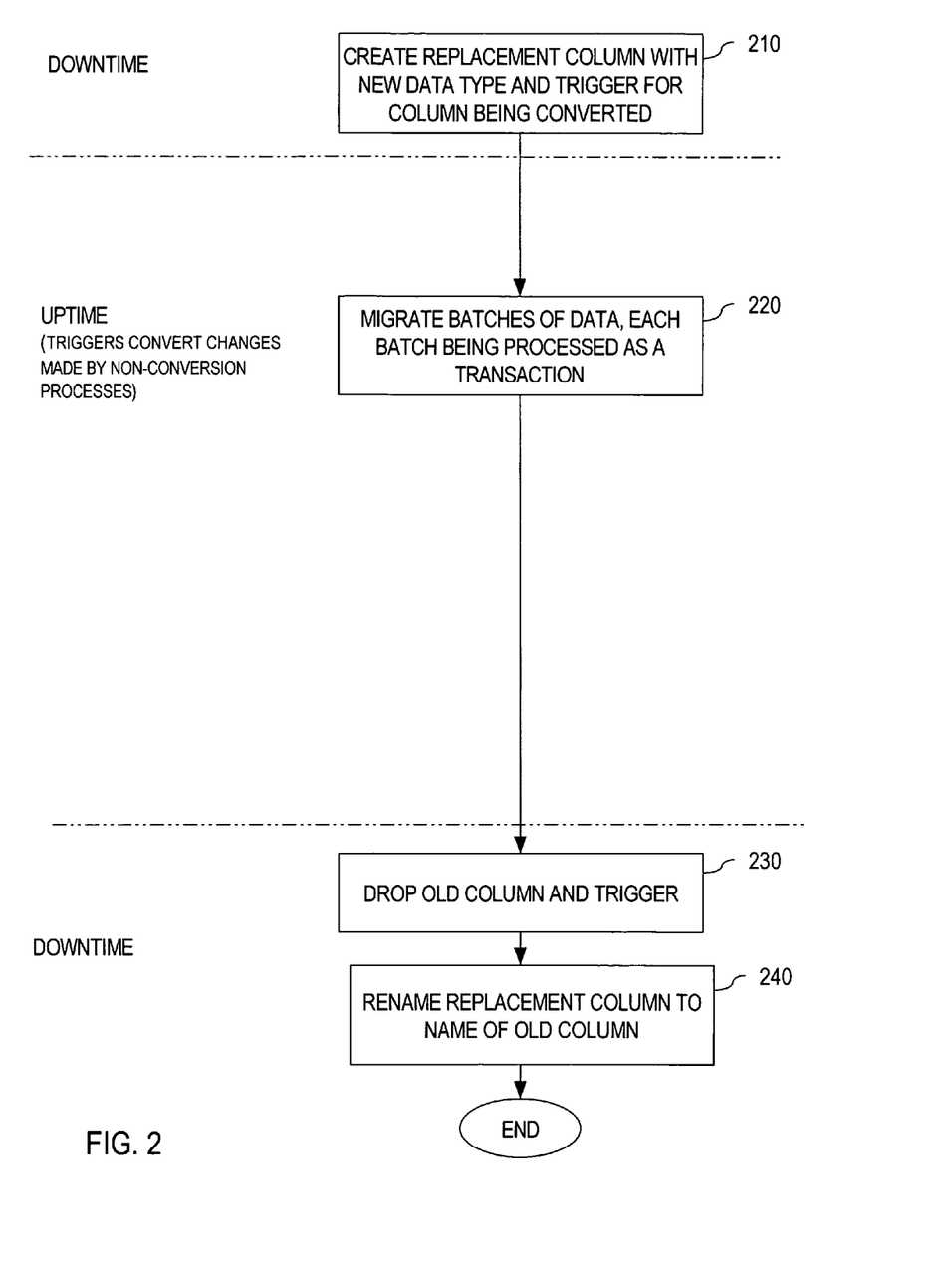
FIG. 2 is a flow chart for performing an online conversion according to an embodiment of the present invention.

FIG. 2 is a flow chart depicting an online conversion procedure according to an embodiment of the present invention. The procedure is illustrated using the table and columns depicted in FIG. 1, and background process CV.

Referring to FIG. 2, at step 210, column B is created for table T, with a new data type of LOB, and trigger TR is created for column A. After step 210, downtime ends and table T may be changed by transactions of processes other than background process CV. The period during which table T is accessible in this way is referred to as uptime.

At step 220, background process CV migrates data from column A to column B. Similar to trigger TR's implementation, the migration involves converting a value from column A to a large binary object and storing the object inline in column B. Alternatively, the object may be stored in a LOB repository (e.g. a file) and column B is updated with a LOB locator that specifies the location to the large binary object.

Step 220 is performed during uptime. Thus, transactions other than those of background process CV, such as user transactions, are making changes to table T. Because trigger TR is invoked whenever a transaction updates column A, column B will reflect any changes made to column A by the other transactions.

To reduce contention for table T between background process CV and non-conversion processes, background process CV migrates data from column A to column B in a series of transactions, which are started and committed one after another. A transaction can simultaneously lock all the rows changed by a transaction. If data were migrated in a single transaction, then all rows in a table would have to be locked simultaneously. Thus, processes changing table T other than background process CV would be blocked by the single transaction. By updating column B in multiple transactions that are serially executed one at a time (i.e. started and committed one at a time), only a portion of the rows in table T need be simultaneously locked by background process CV. Contention between background process CV and other processes is thereby reduced.

Note also that a transaction executed by background process CV does not update column A. User transactions, however, can update column A thus invoking trigger TR automatically.

After migration of the data is complete, the conversion of table T enters a period of downtime. One purpose of this downtime is to allow synchronization with the new version of applications adapted to the new data type of the converted column. Also, during this downtime, DDL operations that require exclusive access to table T are performed.

Next, at step 230, original column A and temporary trigger TR are dropped. This means that the table's metadata definition is altered so that column A and trigger TR are no longer defined for table T. Alternatively, original column A can be redefined as hidden. At step 240, column B is renamed to the name of original column A, which is NOTES.

At the end of step 240, the downtime ends. Table T, with column B renamed as NOTES in place of original column A, becomes available to users, thereby publishing table T and column B as the column named NOTES in table T. In effect, column B has been transformed into column A, but of a new data type.

Alternative Embodiments

The online conversion procedure depicted in FIG. 2 is illustrative but not limiting. For example, multiple background processes may be used to migrate data, and the data type of multiple columns in one or more tables may be converted and the respective replacement columns published simultaneously. The online conversion procedure may be performed by application module executed by a DBMS and/or by the native code of the DBMS. The application module may be provided by a user or by the software vendor of the DBMS. The online conversion procedures can be used with any type of relational or object-relational DBMS, and any type of table supported by relational and object-relational DBMSs, including relational tables, object-relational tables, and object tables.

Hardware Overview

Figure 3:
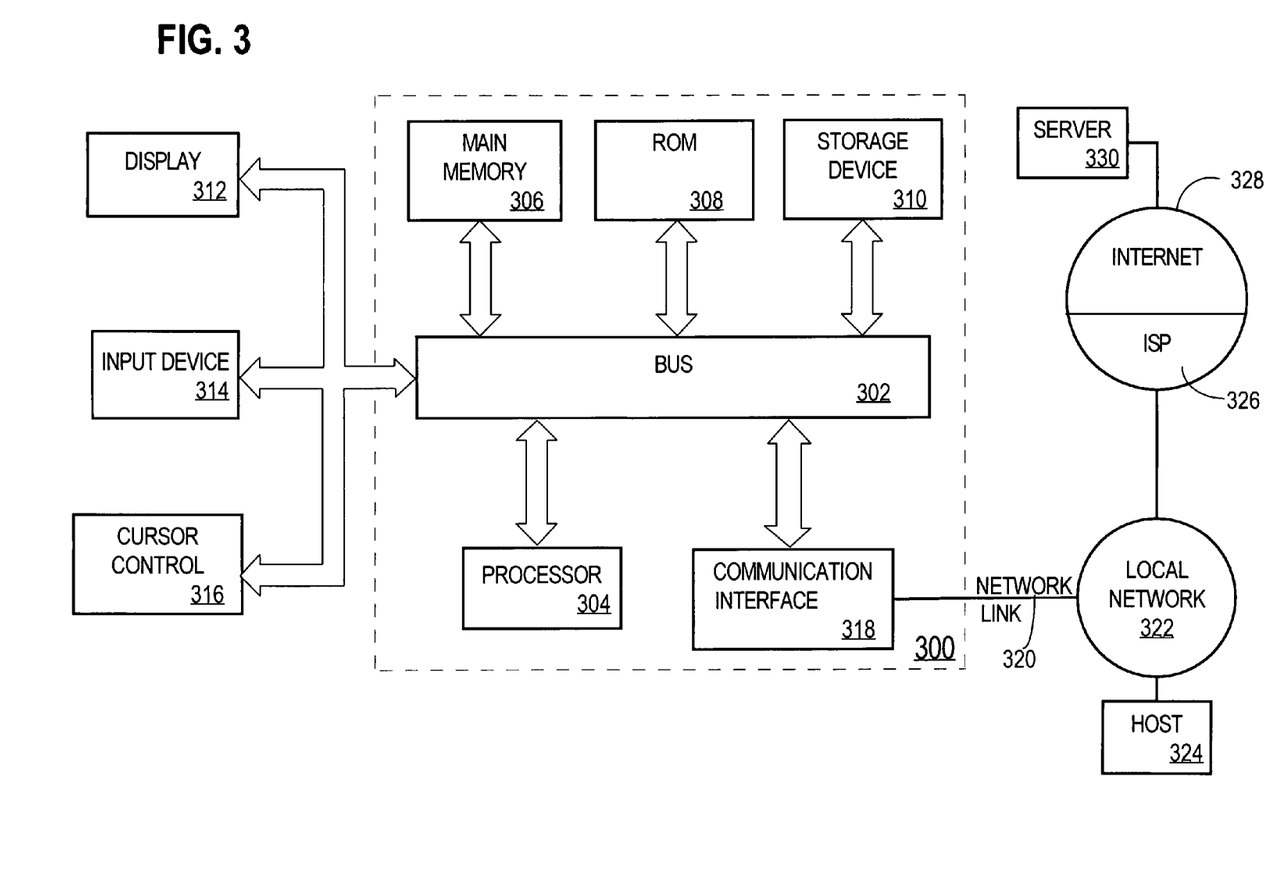
FIG. 3 is a block diagram of a computer system that may be used in an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for a database management system (DBMS) to allow accessing and changing column values in a table column while a data type of the table column is being converted from a first data type to a second data type, comprising steps of:

creating a replacement column of the second data type to replace a first column having a particular name, wherein said replacement column is a hidden column hidden from users of said DBMS;

one or more conversion processes executing to perform migration of said column values from said first column to said replacement column, wherein the migration includes:

converting values from the first column to the second data type; and inserting the values into the replacement column;

while at least one value of the first column has not been migrated to the replacement column by the one or more conversion processes, allowing one or more non-conversion processes to execute concurrently with the one or more conversion processes, the one or more non-conversion processes performing transactions to change a certain value in the first column of the table for a set of rows having column values that have already been migrated to the replacement column during said migration, wherein to change a certain value causes automatically converting the certain value to the second data type and inserting the certain value into the replacement column; and during a first downtime period after said one or more conversion processes complete said migration and said transactions complete, associating the particular name with the replacement column instead of the first column, to cause said DBMS to recognize said replacement column in the table as said first column.

2. The method of claim 1, wherein:

the steps further include creating a trigger for said first column that adds to the replacement column a particular value from the first column that has been translated to the second data type; and causing automatic conversion of the certain value includes invoking said trigger when detecting a change to said first column.

3. The method of claim 2, wherein:

the steps further include causing one or more periods of downtime during which said table may not be accessed by said users; and the replacement column and the trigger are created during the one or more periods of downtime.

4. The method of claim 1, wherein:

a label is associated by the DBMS with said first column; and causing said DBMS to recognize said replacement column as said first column includes causing said DBMS to associate said label with said replacement column instead of said first column.

5. The method of claim 1, wherein the steps further include synchronizing the first downtime period with installation of a version of applications adapted for conversion of said first column to said second data type.

6. The method of claim 1, wherein said first data type is LONG and said second data type is LOB.

7. The method of claim 1, wherein after causing said DBMS to recognize said replacement column as said first column, said first column is deleted.

8. The method of claim 1, wherein after causing said DBMS to recognize said replacement column as said first column, said first column is rendered inaccessible to a set of users.

9. The method of claim 1, wherein said one or more conversion processes executing to perform migration includes causing said one or more conversion processes to execute multiple transactions.

10. The method of claim 1, wherein the certain value has already been migrated to the replacement column when the change to the certain value causes automatically converting the certain value to the second data type and inserting the certain value into the replacement column.

11. A non-transitory computer-readable storage medium for a database management system (DBMS) to allow accessing and changing column values in a table column while a data type of the table column is being converted from a first data type to a second data type, storing one or more sequences of instructions which, when executed by one or more processors, causes the one or more processors to perform steps of:

creating a replacement column of the second data type to replace a first column having a particular name, wherein said replacement column is a hidden column hidden from users of said DBMS;

one or more conversion processes executing to perform migration of said column values from said first column to said replacement column, wherein the migration includes:

converting values from the first column to the second data type; and inserting the values into the replacement column;

while at least one value of the first column has not been migrated to the replacement column by the one or more conversion processes, allowing one or more non-conversion processes to execute concurrently with the one or more conversion processes, the one or more non-conversion processes performing transactions to change a certain value in the first column of the table for a set of rows having column values that have already been migrated to the replacement column during said migration, wherein to change a certain value causes automatically converting the certain value to the second data type and inserting the certain value into the replacement column; and during a first downtime period after said one or more conversion processes complete said migration and said transactions complete, associating the particular name with the replacement column instead of the first column, to cause said DBMS to recognize said replacement column in the table as said first column.

12. The non-transitory computer-readable storage medium of claim 11, wherein: the steps further include creating a trigger for said first column that adds to the replacement column a particular value from the first column that has been translated to the second data type; and causing automatic conversion of the certain value includes invoking said trigger when detecting a change to said first column.

13. The non-transitory computer-readable storage medium of claim 12, wherein:

the steps further include causing one or more periods of downtime during which said table may not be accessed by said users; and the replacement column and the trigger are created during the one or more periods of downtime.

14. The non-transitory computer-readable storage medium of claim 11, wherein:

a label is associated by the DBMS with said first column; and causing said DBMS to recognize said replacement column as said first column includes causing said DBMS to associate said label with said replacement column instead of said first column.

15. The non-transitory computer-readable storage medium of claim 11, wherein the steps further include synchronizing the first downtime period of with installation of a version of applications adapted for conversion of said first column to said second data type.

16. The non-transitory computer-readable storage medium of claim 11, wherein said first data type is LONG and said second data type is LOB.

17. The non-transitory computer-readable storage medium of claim 11, wherein after causing said DBMS to recognize said replacement column as said first column, said first column is deleted.

18. The non-transitory computer-readable storage medium of claim 11, wherein after causing said DBMS to recognize said replacement column as said first column, said first column is rendered inaccessible to a set of users.

19. The non-transitory computer-readable storage medium of claim 11, wherein said one or more conversion processes executing to perform migration includes causing said one or more conversion processes to execute multiple transactions.

20. The non-transitory computer-readable medium of claim 11, wherein the certain value has already been migrated to the replacement column when the change to the certain value causes automatically converting the certain value to the second data type and inserting the certain value into the replacement column certain value causes automatically converting the certain value to the second data type and inserting the certain value into the replacement column.

* * * * *

UNITED STATES PATENT AND TRADEMARK OFFICE
CERTIFICATE OF CORRECTION

PATENT NO. : 8,935,294 B2
APPLICATION NO. : 11/201797
DATED : January 13, 2015
INVENTOR(S) : Vijayan et al.

It is certified that error appears in the above-identified patent and that said Letters Patent is hereby corrected as shown below:

In the Specification,

In column 2, line 3, delete "under going" and insert -- undergoing --, therefor.

In column 3, line 34, delete "base" and insert -- database --, therefor.

In the Claims,

In column 10, line 52, in Claim 15, after "period" delete "of".

In column 11, line 3, in Claim 20, before "medium" insert -- storage --.

In column 11, lines 8-10, in Claim 20, after "replacement" delete "column certain value causes automatically converting the certain value to the second data type and inserting the certain value into the replacement".

Signed and Sealed this
First Day of September, 2015

Michelle K. Lee
*Director of the United States Patent and Trademark Office*